United States Patent [19]
Ohtani

[11] Patent Number: 5,384,207
[45] Date of Patent: Jan. 24, 1995

[54] ELECTRONIC APPARATUS WITH BATTERY POWER SOURCE

[75] Inventor: Daisuke Ohtani, Tokyo, Japan

[73] Assignee: Matsushita Electric Industrial Co., Ltd., Osaka, Japan

[21] Appl. No.: 89,556

[22] Filed: Jul. 12, 1993

[30] Foreign Application Priority Data

Jul. 15, 1992 [JP] Japan ................... 4-187808

[51] Int. Cl.$^6$ .................................................. H01M 2/10
[52] U.S. Cl. ......................................... 429/9; 429/99; 429/100
[58] Field of Search ............................. 429/9, 99, 100

[56] References Cited

U.S. PATENT DOCUMENTS

| | | |
|---|---|---|
| 4,057,677 | 11/1977 | Mabuchi . |
| 4,853,302 | 8/1989 | Yamanaka et al. ............. 429/99 |
| 4,863,812 | 9/1989 | Ueda et al. ...................... 429/9 |
| 5,071,716 | 12/1991 | Petzl et al. . |

FOREIGN PATENT DOCUMENTS

| | | |
|---|---|---|
| 1402486 | 8/1975 | United Kingdom . |
| 1412724 | 11/1975 | United Kingdom . |
| 2095460A | 9/1982 | United Kingdom . |

Primary Examiner—Prince Willis, Jr.
Assistant Examiner—M. Nuzzolillo
Attorney, Agent, or Firm—Stevens, Davis, Miller & Mosher

[57] ABSTRACT

An electronic apparatus is provided with a movable holder in a battery mounting portion of the apparatus. The holder has electrode terminals on one side thereof, and a cavity is formed in the opposite side of the holder. Parts of the terminal protrude into the cavity. When a rechargeable battery is used, the battery is mounted in the battery mounting portion with one end of the battery received in the cavity of the holder. An electrode of the battery contacts with the terminal parts which protrude into the cavity. When dry batteries shorter than the rechargeable battery are used, the holder is attached to the battery mounting portion with its orientation reversed. The terminals abut against electrodes of the dry batteries, and the holder fills in a vacancy formed by attachment of the dry batteries. When either of the batteries having different lengths is used, it is not necessary to detach the holder from the apparatus, so that the problem of troublesomeness in carrying the holder can be solved, to thereby improve the usability of the electronic apparatus.

7 Claims, 3 Drawing Sheets

ELECTRONIC APPARATUS WITH BATTERY POWER SOURCE

BACKGROUND OF THE INVENTION

The present invention relates to an electronic apparatus or device with a battery power source contained therein, in which a rechargeable battery and customary cylindrical dry batteries can be replaced with each other. This invention is suitable, although not exclusively, for application to radio communication devices for a mobile telecommunication system to improve their usability.

Many portable electronic apparatuses or devices have therein batteries as a power source, and are designed such that a rechargeable battery and dry batteries can be replaced with each other. One example of such electronic apparatus is a portable cordless telephone. An essential portion of a conventional cordless telephone will be described with reference to FIGS. 6 and 7.

FIG. 6 shows a battery mounting portion of the cordless telephone with parts thereof in cross section. Illustrated in this figure is a condition that a rechargeable battery is mounted. In the figure, reference numeral 1 denotes a housing of the cordless telephone, in which the battery mounting portion is formed integrally on the rear of the housing. A rechargeable battery pack 2 mounted therein has an outer casing 2a which is made of a plastic material. A plurality of rechargeable battery cells are accommodated in this casing. The battery cells are connected to one another through metal pieces, thus forming a battery unit 2b. Electrode contacts 2c are provided on a rear portion of the casing 2a and connected to the battery unit 2b. Contacts 3 for supplying electric power to an internal circuit (not shown) of the cordless telephone are fixed on the bottom of the battery mounting portion 1a (upper in the drawing) by means of screw fastening or thermal caulking. Reference numeral 4 denotes a cover of the battery mounting portion, which is engaged with the housing 1 to hold the battery pack 2.

On the other hand, FIG. 7 shows the battery mounting portion 1a in a state that customary cylindrical dry batteries, such as AAA-size dry batteries, are mounted in place of the rechargeable battery pack 2. In FIG. 7, reference numeral 5 denotes a dry-battery power source pack. The power source pack 5 includes an attachment holder 5a made of a plastic material, in which a plurality of dry batteries 6 are accommodated. The holder 5a has conical coil springs 5b which contact with minus electrodes of the respective dry batteries 6 and exert contact pressures on them, and terminals 5c which contact with plus electrodes of the dry batteries. Further, contacts 5d are provided on the holder 5a at substantially the same positions as the contacts 2c of the rechargeable battery pack 2 shown in FIG. 6, and serve as power output terminals of the dry batteries 6. The attachment holder 5a is formed in substantially the same shape as the outer casing 2a of the rechargeable battery pack 2 to be compatible with the battery pack 2. When the rechargeable battery pack 2 is attached in the battery mounting portion 1a, as shown in FIG. 6, the contacts 2c of the battery pack 2 contact with the respective contacts 3 on the battery mounting portion side, and electric power is supplied to the internal circuit (not shown) of the cordless telephone. Then, the cover 4 is engaged with the housing 1 to prevent the rechargeable battery pack 2 from dropping when the cordless telephone is used or carried. The dry-battery power source pack 5 is attached to the cordless telephone in place of the rechargeable battery pack 2 as shown in FIG. 7 and can be used during an emergency, for example, when power of the battery pack 2 is exhausted and it can be used no longer.

However, in order to use the dry-battery power source pack 5 during an emergency in the above-described manner, it is necessary to carry the power source pack 5 or at least the holder 5a in addition to the cordless telephone. Carrying the power source pack 5 or the holder 5a is troublesome, and there is a risk that they will be lost or broken.

SUMMARY OF THE INVENTION

In view of the above-described problem, it is an object of the present invention to provide an electronic apparatus with a battery power source contained therein, in which a rechargeable battery and other batteries such as customary cylindrical dry batteries can be replaced with each other even if they differ from each other in overall length, which electronic apparatus is easily and efficiently operated and handled.

To this end, the invention aims at providing a holder adapted for use with different kinds of batteries, enabling the different kinds of batteries to be alternately mounted in the apparatus, thereby removing the necessity of separately carrying an alternate holder and solving the problem of inconvenience of carrying an alternate holder.

An electronic apparatus according to the invention comprises battery compartment means for alternatively receiving at least one first battery and at least one second battery which is shorter than the first battery, each of the batteries having at least one electrode at one longitudinal end portion thereof, holder means for filling a vacancy in the battery compartment means when the second battery is mounted, the holder means being formed so as to be capable of being selectively attached to one end of the battery compartment means with its orientation reversed, the holder means including a cavity formed in one side thereof for receiving an end portion of the first battery to thereby provide a space for accommodating the first battery, terminal means for electrical connection with the electrodes of the first and second batteries, the terminal means being attached to another side of the holder means which is opposite to the side where the cavity is formed, the terminal means including a first portion which faces outside of the holder means to contact with the electrode of the second battery, and a second portion which faces the cavity to make contact with the electrode of the first battery; and resilient means provided at the other end of the battery compartment means for pressing the first and second batteries against the terminal means.

With the above-described structure, when the second battery is used in place of the first battery, the first battery is removed, and further, the holder means are detached from the battery compartment means. Then, the detached holder means are reversed in orientation and attached to the battery compartment means again, and the second battery is mounted in the battery compartment means with its electrode abutting against the first portion of the terminal means on the holder.

DETAILED DESCRIPTION OF THE PREFERRED EMBODIMENT

The preferred embodiment of the present invention will now be described with reference to the attached drawings. In the description, a cordless telephone is exemplified as an electronic apparatus having a battery contained therein in accordance with the invention.

Figure 1:
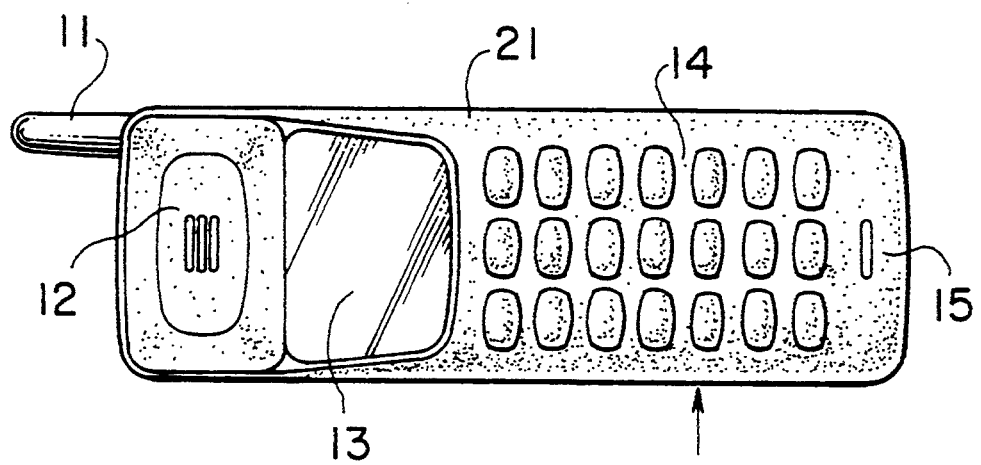
FIG. 1 is a front view showing an outer appearance of a cordless telephone according to an embodiment of the invention.

FIG. 1 shows an outer appearance of the cordless telephone. In FIG. 1, reference numeral 11 denotes a whip antenna, 12 denotes a speaker section, 13 denotes a liquid crystal display (LCD), 14 denotes a keyboard section, 15 denotes a microphone section and 21 denotes a housing.

Figure 2:
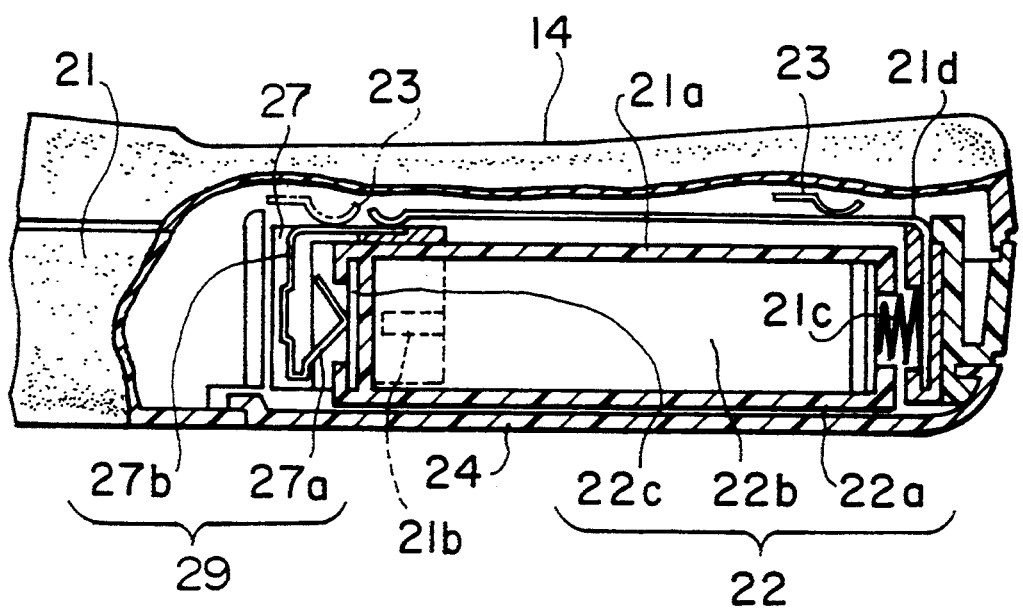
FIG. 2 is a partially cross-sectional side view showing a battery power source section of the embodiment of FIG. 1 in a state that a rechargeable battery is mounted.
Figure 3:
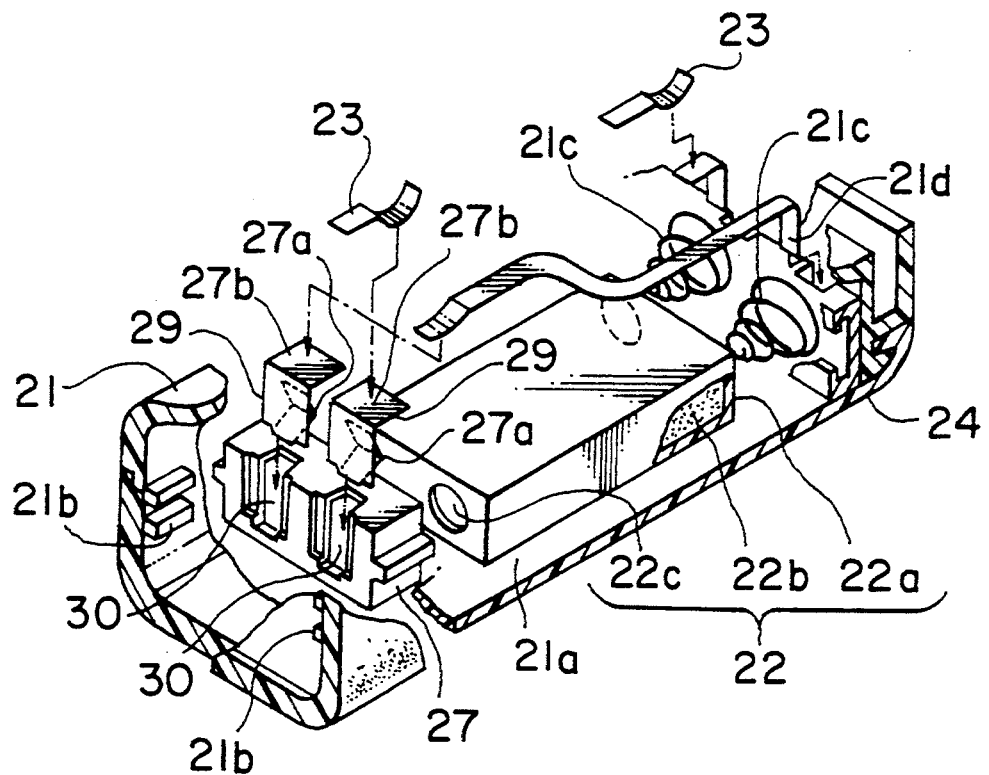
FIG. 3 is an exploded perspective view of the battery power source section of FIG. 2.
Figure 4:
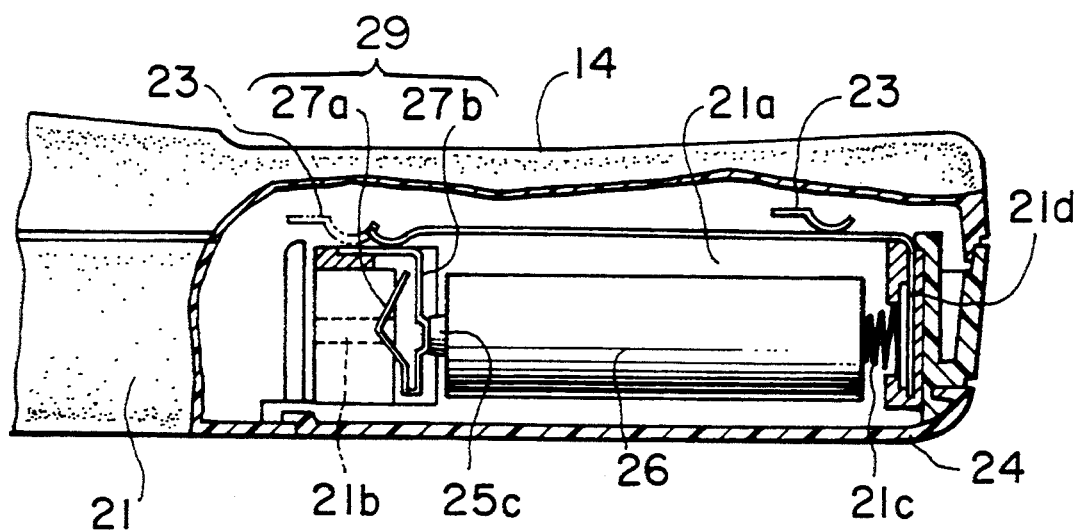
FIG. 4 is a partially cross-sectional side view showing the battery power source section of FIG. 2 in a state that customary cylindrical dry batteries are mounted.
Figure 5:
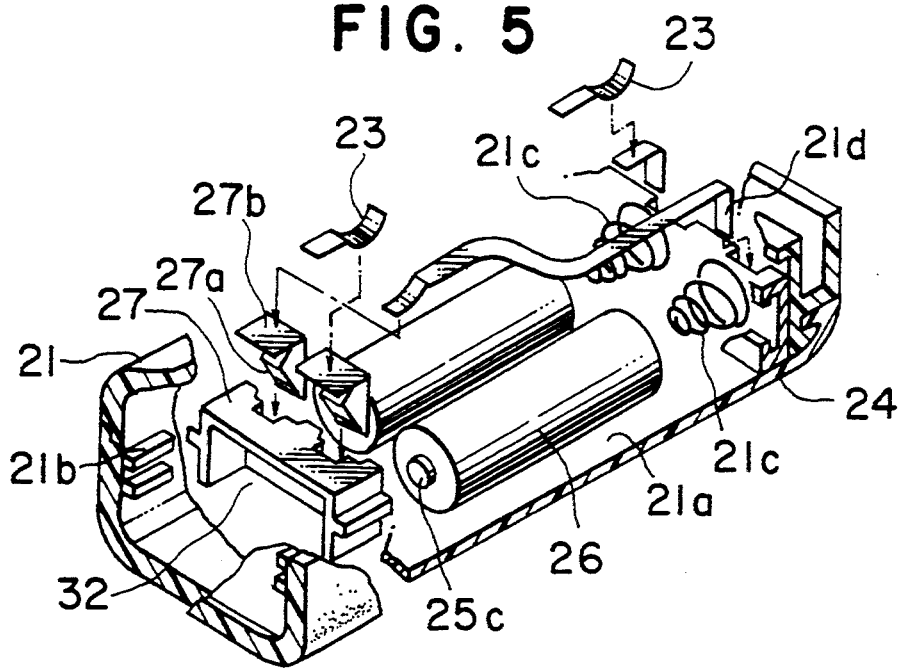
FIG. 5 is an exploded perspective view of the battery power source section of FIG. 4.
Figure 6:
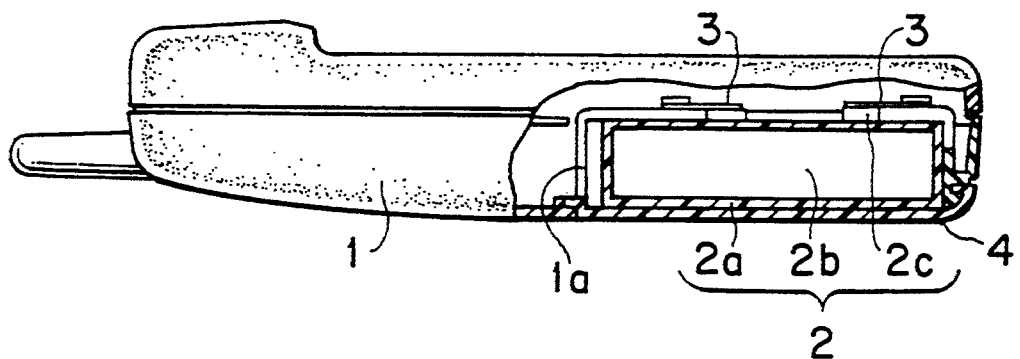
FIG. 6 is a partially cross-sectional side view showing a battery mounting portion of a conventional cordless telephone in a state that a rechargeable battery is mounted.
Figure 7:
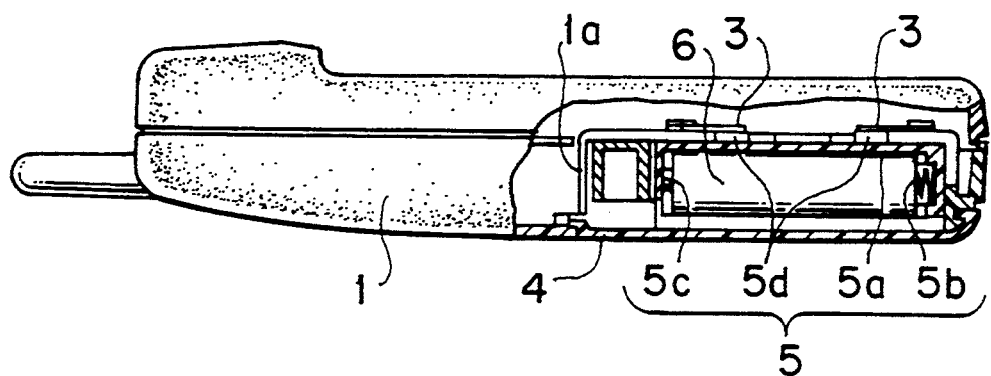
FIG. 7 is a partially cross-sectional side view showing the battery mounting portion of FIG. 6 in a state that customary cylindrical dry batteries are mounted.

FIG. 2 shows a battery power-source section of the cordless telephone, as viewed in a direction indicated by the arrow in FIG. 1. This battery power-source section is in a state that a first battery for normal use, i.e., a rechargeable battery pack, is attached. The structure of FIG. 2 is shown in FIG. 3 in an exploded condition. FIG. 4 shows the battery power source section in a state that a second battery array, i.e., customary cylindrical dry batteries such as AAA-size dry batteries, is attached in place of the first battery. The structure of FIG. 4 is shown in FIG. 5 in an exploded condition.

As shown in FIGS. 2 and 3, a battery compartment or a battery mounting portion 21a is integrally formed in the rear of the housing 21.

The rechargeable battery pack 22 includes an outer casing 22a made of a plastic material, and a battery unit 22b is accommodated in the casing. A plurality of rechargeable battery cells are connected to one another by metal pieces, and constitute the battery unit 22b. The battery unit 22b has a plus electrode 22c and a minus electrode (not shown) which is located opposite to the plus electrode. Each of the electrodes is exposed through a hole formed in the outer casing 22a, as shown in FIG. 3.

Two plus and minus electrode contacts 23 for supplying power to the cordless telephone are attached to the battery mounting portion 21a. The contacts 23 are fixed to the bottom of the battery mounting portion 21a (upper in the figure) by screw fastening or thermal caulking, and connected to an internal circuit (not shown) of the cordless telephone.

A movable holder 27 is detachably provided at one end of the battery mounting portion 21a. When AAA dry batteries are used, as will be described later, the movable holder 27 is detached temporarily to reverse its direction 180 degrees, and is attached again to fill in a vacancy formed in the battery mounting portion 21a. The holder 27 is in a substantially rectangular shape and extends across the battery mounting portion 21a. A cavity 32 for insertion of a head portion of the rechargeable battery pack 22 is formed in a longer side of the holder 27 which faces the other end of the battery mounting portion 21a. Thus, the holder 27 has a substantially inverted L-shaped cross section. Straight ridges are formed on opposite ends of the holder 27, respectively. On the other hand, guide grooves, corresponding to the ridges of the holder 27, are defined by pairs of ribs 21b which are formed on associated inner side surfaces of the battery mounting portion 21a, respectively. The ridges of the holder 27 are engaged with the respective guide grooves of the ribs 21b, so that the holder 27 is supported in the battery mounting portion 21a. The holder 27 is attached and detached by sliding its ridges along the guide ribs 21b.

Further, two openings 30 are formed in the longer side portion of the holder 27, which is opposite to the longer side portion where the cavity 32 is formed, and these two openings communicate with the cavity 32. An electrode terminal 29 is fixed on each of the openings 30 to contact with the electrode of the rechargeable battery pack 22 or that of a dry battery.

Each electrode terminal 29 comprises a V-shaped portion 27a and an L-shaped portion 27b connected to one end of this V-shaped portion. The V-shaped portion 27a is folded to overlap with the L-shaped portion 27b so as to be resilient. Each electrode terminal 29 is fixed on the associated opening 30 with its V-shaped portion 27a facing the cavity 32 of the holder. As will be described later, the V-shaped portion 27a makes contact at its point with the plus electrode of the rechargeable battery pack 22, and the L-shaped portion 27b makes contact with a plus electrode 25c of a AAA dry battery.

Two conical coil springs 21c are provided at the other end of the battery mounting portion 21a, and serve as both electrode terminals and resilient means. Each coil spring 21c is held with one end thereof being engaged in a slot which is formed in a partition wall of the battery mounting portion 21a, and the other end of the spring protrudes into the battery mounting portion 21a. Further, an L-shaped connector 21d is provided to electrically connect one of the coil springs 21c (the right one in FIG. 3) with one of the electrode terminals 29 (the left one in FIG. 3) on the movable holder 27. One end of the connector 21d is inserted in the slot for the right coil spring 21c. The connector 21d extends along the battery mounting portion 21a to the movable holder 27 to be capable of contacting at its other end with the L-shaped portion 27b of the left terminal 29.

In the drawings, reference numeral 24 denotes a cover of the battery mounting portion. The cover 24 is adapted to slide on the housing 21 from the bottom to the top (from the right to the left in the drawings) to be mounted/fixed on the housing, to thereby support the battery pack 22.

In the battery power-source section shown in FIGS. 4 and 5, in order to mount two AAA dry batteries, the movable holder 27 is slid along the guide ribs 21b and detached temporarily from the battery mounting portion 21a. After that, the orientation of holder 27 is reversed 180 degrees and holder 27 is attached again to the guide ribs 21b. In this condition, the L-shaped portions 27b of the electrode terminals on the holder 27n face the inside of the battery mounting portion 21a.

When dry batteries 26 are mounted in the battery mounting portion 21a, the minus electrode of each dry battery contacts with the associated coil spring 21c. Under the pressure of the coil spring 21c, the plus electrode 25c of the dry battery contacts with the L-shaped portion 27b of the associated terminal 29. Simultaneously, by this force, the above-described one of the coil springs 21c (the right one in FIG. 5) is pressed against and electrically connected to one end of the L-shaped connectors 21d. Thus, the two dry batteries 26 are electrically connected in series.

The function of the battery power-source section of the cordless telephone according to the embodiment will be described.

Referring to FIGS. 2 and 3, when the rechargeable battery pack 22 is mounted in the battery mounting portion 21a, the plus electrode 22c of the battery pack 22 contacts with the V-shaped portion 27a of the other electrode terminal 29 (the right one in FIG. 3) on the movable holder 27. The minus electrode of the battery pack contacts with the other coil spring 21c (the left one in FIG. 3) under pressure.

At this time, by the pressure of the coil springs 21c, a free end of the V-shaped portion 21a of 25 the above-described one electrode terminal 29 (the left one in FIG. 3) on the movable holder 27 contacts with the L-shaped portion 27b of the same terminal. Further, the above-described right coil spring 21c contacts with the one end of the L-shaped connector 21d.

Moreover, the L-shaped portion 27b of the above-described right electrode terminal 29 and the left coil spring 21c contact with the two contacts 23, respectively. Power from the battery pack 22 is extracted through these two contacts and supplied to the internal circuit (not shown) of the cordless telephone.

After mounting the rechargeable battery pack 22, the cover 24 of the battery mounting portion is engaged with the housing 21, thereby preventing the battery pack 22 from dropping.

The case where AAA dry batteries are mounted for use in place of the rechargeable battery pack 22 will be described.

Before mounting the AAA dry batteries, the movable holder 27 is slid along the guide ribs 21b and detached temporarily from the battery mounting portion 21a. After that, as shown in FIGS. 4 and 5, the orientation of holder 27 is reversed 180 degrees and holder 27 is attached again to the guide ribs 21b. Then the two dry batteries 26 are inserted in the battery mounting portion 21a. The minus electrodes of the dry batteries 26 respectively contact with the two coil springs 21c. Under the pressure of the coil springs 21c, the plus electrodes 25c of the dry batteries respectively contact the L-shaped portions 27b of the two electrode terminals 29 on the movable holder 27. The other component parts function in substantially the same manner as in the above-described case when the rechargeable battery pack 22 is mounted.

In this manner, the movable holder 27 is provided movably along the guide ribs 21b, and can be attached again, in a reverse direction, to the battery mounting portion 21a. Therefore, with the holder attached on the cordless telephone, the rechargeable battery pack 22 and the dry batteries 26 can be used alternatively.

The electronic apparatus with a battery contained therein according to the invention has been described on the basis of the cordless telephone. However, the invention is not limited solely to this specific form. It is possible to effect various modifications on the cordless telephone of the illustrated and described embodiment, or the invention can take other forms than the cordless telephone, within the scope of the accompanying claims. For example, in the above-described embodiment, the number of dry batteries 26 need not be limited to two, and a similar structure may be added so that three or more dry batteries 26 can be mounted. Also the dry batteries may be of different size. Moreover, the invention is applicable to various kinds of electronic apparatus having batteries built therein, such as a portable radio, a portable cassette tape player and a portable measuring instrument. In the case of such an apparatus, the structure of the battery power-source section according to the above-described embodiment is applicable without greatly modifying it.

As readily understood from the above description, it is not necessary to detach the movable holder from the electronic apparatus of this invention when either of the rechargeable battery and the customer cylindrical dry batteries which have different overall lengths is used, thereby solving the prior art problem that carrying the holder is troublesome. Consequently, it is possible to attain an electronic apparatus in which two kinds of batteries having different lengths can be replaced with each other, wherein the apparatus can be handled easily.

What is claimed is:

1. An electronic apparatus having a battery power source contained therein, comprising:
   battery compartment means for alternatively receiving at least one first battery and at least one second battery, said second battery being shorter than said first battery, each of said batteries having at least one first terminal at a first longitudinal end portion thereof;
   holder means for filling a vacancy in said battery compartment means when the second battery is mounted, said holder means being formed to be capable of being selectively attached to a first end of said battery compartment means with orientation of said holder means reversed, said holder means including a cavity formed in a first side thereof for receiving an end portion of the first battery to thereby provide a space for accommodating the first battery;
   terminal means for electric connection with the first terminal of the first and second batteries, said terminal means being attached to a second side of said holder means opposite to said first side of said holder means where said cavity is formed, said terminal means including a first portion facing outside of said holder means to contact with the first terminal of the second battery, and a second portion facing said cavity to contact with the first terminal of the first battery; and
   resilient means provided at a second end of said battery compartment means for pressing the first and second batteries against said terminal means.

2. The apparatus according to claim 1, wherein said first and second batteries have at second longitudinal end portions thereof, respectively, and said resilient means contact with the second terminals of the first and second batteries to effect electric connection.

3. The apparatus according to claim 1, further comprising means for detachably supporting said holder means in said battery compartment means.

4. The apparatus according to claim 3, wherein said support means comprise ridges respectively formed on opposite portions of said holder means which are terminal ends of said holder means in a direction across a longitudinal direction of said battery compartment means, and guide grooves formed in said battery compartment means at positions corresponding to said ridges, said ridges being engaged in the respective guide grooves slidably.

5. The apparatus according to claim 1, wherein said first battery comprises an outer casing and a plurality of rechargeable battery cells accommodated in said outer casing, said second battery comprises cylindrical dry batteries, and said cavity of said holder means is in a shape which is adapted to an end portion of said outer casing of the first battery.

6. The apparatus according to claim 1, wherein said cavity communicates with said second side of said holder means through an opening formed therein, said opening has a size for insertion of the electrode of the first battery, and said second portion of said terminal means protrudes into said opening.

7. The apparatus according to claim 2, wherein said battery compartment means define a space in which either of a plurality of first batteries and a plurality of second batteries can be accommodated in parallel, and said terminal means include a plurality of electrode terminals corresponding to the respective batteries accommodated in said battery compartment means, said resilient means include a plurality of conical coil springs corresponding to the respective batteries accommodated in said battery compartment means, the conical coil spring for a battery being electrically connected to the electrode terminal for an adjacently accommodated battery, so that the batteries accommodated in said battery compartment means are electrically connected in series.

* * * * *